United States Patent [19]

Mackey, Sr.

[11] Patent Number: 4,662,732
[45] Date of Patent: May 5, 1987

[54] COMBINATION FILM AND FILM SUPPLY AND TAKE-UP SYSTEM COVER

[76] Inventor: Frederick A. Mackey, Sr., 416 Guylyn Dr., Pittsburgh, Pa. 15235

[21] Appl. No.: 852,232

[22] Filed: Apr. 15, 1986

[51] Int. Cl.$^4$ .............................................. G03B 21/00
[52] U.S. Cl. .............................. 352/128; 242/55.19 R; 242/55.19 A
[58] Field of Search ................. 352/128; 242/55.19 R, 242/55.19 A

[56] References Cited

U.S. PATENT DOCUMENTS

| | | | |
|---|---|---|---|
| 3,780,959 | 12/1973 | Burth | 352/128 |
| 4,169,566 | 10/1979 | Boudouris et al. | 352/128 |
| 4,186,891 | 2/1980 | Johnson | 352/128 |
| 4,208,018 | 6/1980 | Wilkinson | 352/128 |

Primary Examiner—Monroe H. Hayes

[57] ABSTRACT

A protective cover specifically tailored to the shape and needs of motion picture film, more particularly film-supply and film take-up apparatus, and characterized by a canopy of circular shape with overhanging edges, and being made of durable, waterproof, lightweight material. Said cover includes skirt assembly which can be adapted to enclose various apparatuses of varying heights and circumferences, including a means for cover skirt's rapid longitudinal expansion or contraction permitting ready access to film or film-supply and take-up apparatus, together with the ability for continued apparatus and film observation due to skirt being constructed of transparent material, regardless of open or closed position of skirt.

1 Claim, 10 Drawing Figures

COMBINATION FILM AND FILM SUPPLY AND TAKE-UP SYSTEM COVER

BACKGROUND OF THE INVENTION

Motion picture film is relatively delicate, and must be operated in avoidance of mechanical or other abrasive contact. The constant exposure to environmental pollutants must be avoided during periods of film use and non-use. Airborned abrasive pollutants permitted to settle on or impregnate the film surfaces can cause actual loss of reproductable recorded image, sound distortion, unacceptable viewer annoyance and expensive repairreplacement costs. Furthermore, the retentive properties of film lubrication, emulsion and electrostatic charge collectively and inconcert manifest the need for protective covering.

Film supply and take-up apparatuses in patent literature are made reference to, such as but not limited to, (single turntable), (platter), (band winding device), (center feed unwinder), (endless loop), (supply and take-up system for film), (close loop film), (closed loop film transport), (apparatus for film and transport), (apparatus for film and tape winding), and (rotation tape accumulator). Hereinafter film supply and take-up apparatus shall for the purposes of clarity also encompass the aforesaid in parenthesis devices. Hereinafter motion picture film is also referred to as film.

Motion picture theaters and display systems for commercial and noncommercial purposes and in other arrangements cause film to be drawn from a coiled condition projected and thereafter return to a coiled condition preparatorily for reuse. It has heretofore been the general practice to provide a supply and take-up system comprising a double-reel system in which the coiled film is drawn from the periphery of the supply reel, passed through a motion picture projector, and take-up or recoiled progressively outwardly upon the hub of the take-up reel.

Commonly during use said supply reel and take-up reel are enclosed in apparatuses disclosed in U.S. Pat. No. 1,321,679 issued Nov. 11, 1919 to Stevens and U.S. Pat. No. 1,960,384 issued May 29, 1934 to Lincoln. Referred to as magazines, said enclosure did reduce fire hazzard and also protected film from exposure to airborne pollutants. During periods of non-use in association with the double reel system, motion picture film was wound on the reels and stored in film cans or bins.

Improved film transport apparatuses which eliminated the use of said magazines and film bins generally comprising two platters with means to supply and thereafter take-up film are representatively disclosed in U.S. Pat. No. 3,661,337 issued May 9, 1972 to Burth, U.S. Pat. No. 3,780,959 issued with limitations Dec. 25, 1973 to Burth, U.S. Pat. No. 4,169,566 issued July 16, 1974 to Potts, U.S. Pat. No. 3,823,890 issued July 16, 1974 to Potts and U.S. Pat. No. 4,010,910 issued Mar. 8, 1977 to Boudouris.

Further improved film transport apparatuses eliminating the use of magazines and film bins are representatively disclosed in U.S. Pat. No. 4,066,221 issued Jan. 3, 1978 to Johnson, U.S. Pat. No. 4,186,891 issued Feb. 5, 1980 to Johnson, U.S. Pat. No. 4,208,018 issued June 17, 1980 to Wilkinson in which one horizontal platter is provided with means to supply and take-up film in an endless convoluted condition as disclosed in the various patents cited.

In addition to the aforesaid magazines, film cans and film bins, where no longer practical to wind film not in use on to reels for storage in bins or cans, currently plastic garbage bags, popcorn bags, plastic paint drop sheet covers, natural or synthetic rags and disgarded newspaper have been observed arraued over film and apparatus not in use.

Therefore, a need exists for a new and improved instrument combination film and film supply and take-up system cover which overcomes the disadvantages associated with current use of the film and double and single platter film supply platter and take-up apparatuses.

OBJECT OF THE INVENTION

The present invention relates to a new and useful improvement in covers particularly, although not exclusively, for motion picture and associated film supply and take-up apparatus.

Accordingly, it is an object of the present invention to provide an apparatus of a disclosed arrangement to enclose the aforesaid film and said double or single platter film supply and take-up apparatuses during periods of film use and non-use.

Another object of the present invention is to provide a new and improved combination film and film supply and take-up cover which is inexpensive to manufacture, simple to use, and obstructive to airborne particles and-/or droplet ingress.

Another object of the present invention is to provide a new and improved combination film and film supply and take-up cover which can be adapted to enclose various apparatus of varying heights and circumferences.

Another object of the present invention is to provide a new and improved combination film and film supply and take-up cover of the above disclosed type which includes a vertical support and attaching column with access indentures for film ingress and egress.

Another object of the present invention is to provide a new and improved combination film and film-supply and take-up cover of the disclosed type which includes skirt means for cover skirt's rapid longitudinal expansion or contraction permitting operator-projectionist ready access to the motion picture film and double or single film supply.

Another object of the invention is to provide a new and improved combination film and film-supply and take-up cover of transparent material permitting operator-projectionist continued apparatus observation and inspection.

Another object of the invention is to provide protective covers which are of neat appearances and of durable construction so constructed as to be water repellant and to exclude environmental pollutants such as dirt, dust lint, solvent and cigarette smoke, ash or similar pollutants from settling on film and platter apparatuses.

Another object of the invention is to provide a protective covering for film of the character herewithin described, which is lightweight and simple in construction, thus economical to manufacture and thoroughly practical and well suited for the purpose which it is designed.

A further object is to provide a protective covering which has reinforced edges as opposed to unfinished edges which would become frayed and ragged from use.

These object I accomplish by means of such structure and relative arrangement of parts as will fully appear by a perusal of the following specifications and claims.

BRIEF DESCRIPTION OF THE DRAWINGS

This invention can be more fully understood from the following detailed description when taken in conjunction with the accompanying drawings, in which.

DETAILED DESCRIPTION OF THE PREFERRED EMBODIMENTS

Figure 1:
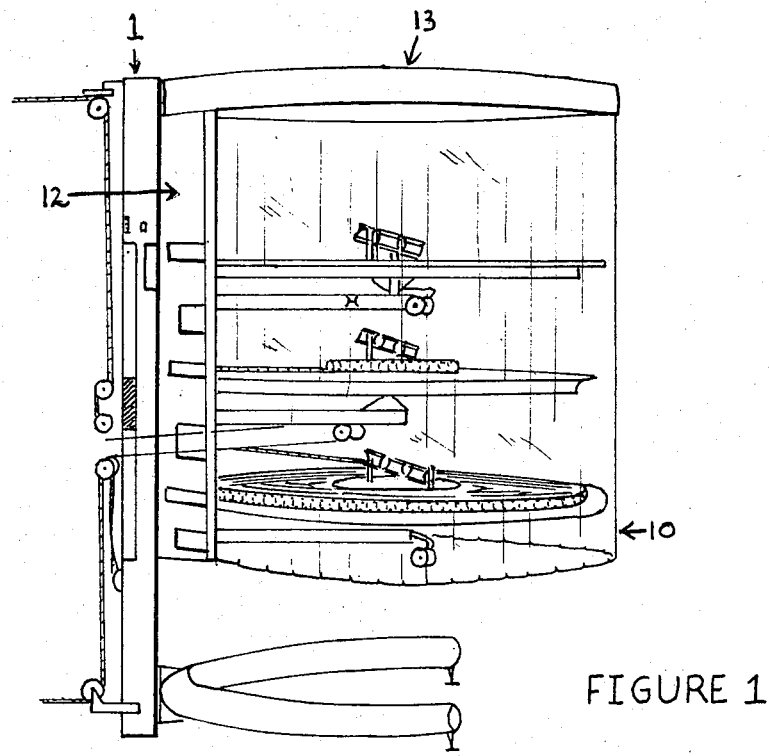
FIG. 1 is a right side perspective view of invention and film and film-supply and take-up apparatus with canopy skirt in an expanded condition.

In FIG. 1 a right side view of a combination film-supply and take-up cover is presented covering an exemplary film-supply and take-up film apparatus.

Figure 4:
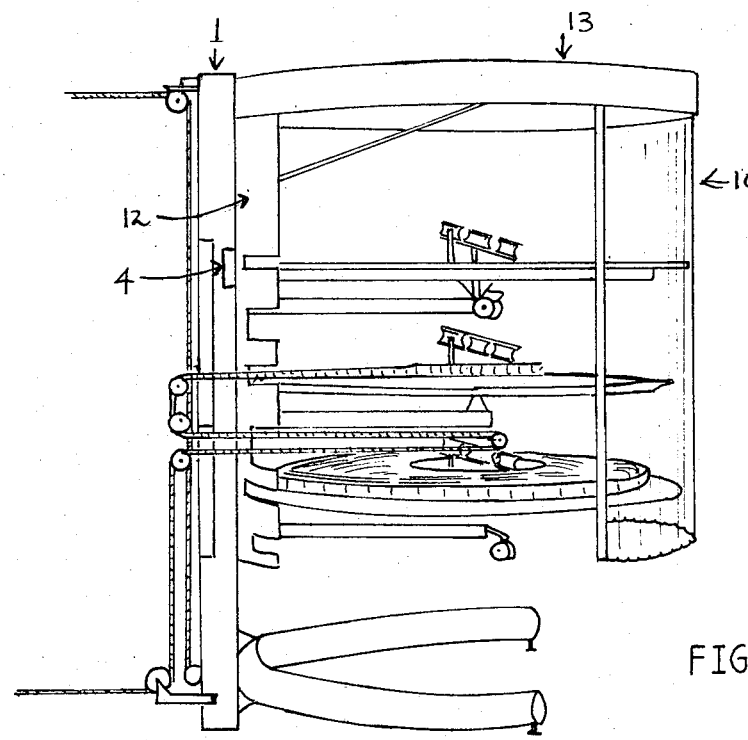
FIG. 4 is a right side perspective view of invention and film and film-supply and take-up apparatus with the canopy skirt in compressed condition permitting projectionist access.
Figure 5:
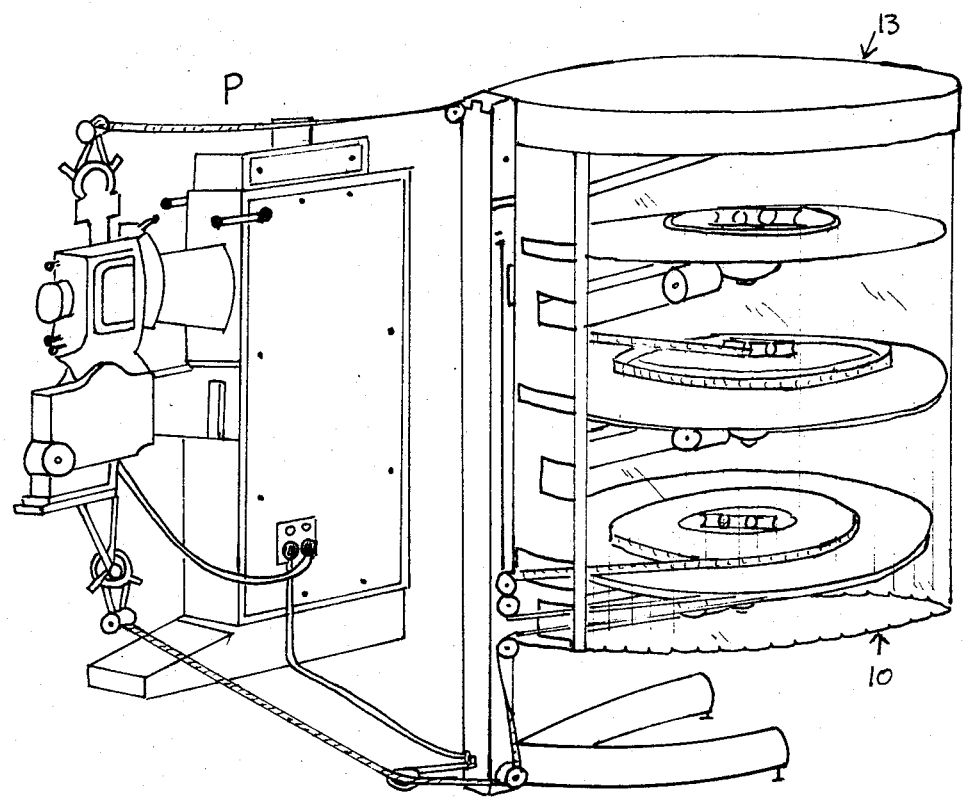
FIG. 5 is an oblique view of motion picture projector, film and film-supply and take-up apparatus enclosed by invention.

In FIG. 4 a right side view of a combination film-supply and take-up cover with skirt in a compressed condition is presented with take-up apparatus.

Figure 2:
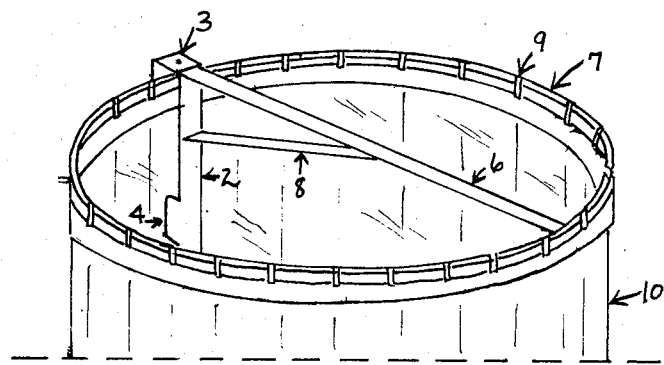
FIG. 2 is a front-right fractional oblique view of invention support and attaching frame.
Figure 3:
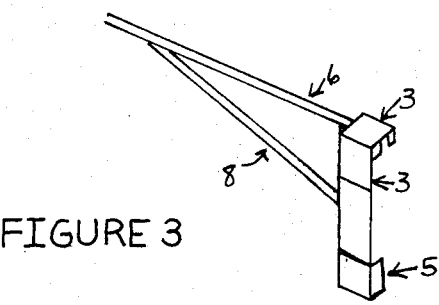
FIG. 3 is a rear-left fractional oblique view of invention support and attaching column.

The invention comprises a support frame FIG. 2 and FIG. 3 composed of a vertical support-attach column 2 with complimentary stop plates 3, 4 and 5 and horizontal beam 6 extending to and in support of innermost and outermost periphery of the circular support rail 7.

Complimentary support means for horizontal support beam 6 is provided by extending brace 8 from center of the horizontal beam 6 downwardly in a diagonal direction to the lower portion of the described vertical support-attaching column 2.

Support for apparatus frame 2 and apparatus is composed of a vertical support attacing comlumn 2 being fixed to a film-supply and take-up vertical column 1 providing stable support supporting invention a reasonable distance above film and film-supply and take-up apparatus.

Figure 10:
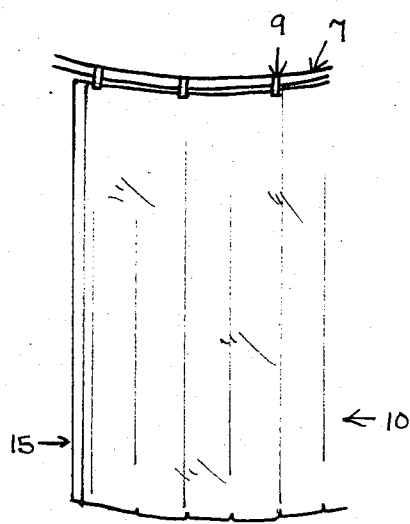
FIG. 10 is a fractional view of canopy skirt assembly in attached condition affixed to circular support rail by rings.

In FIG. 2 I have shown an arrangement for the suport and retention of cover skirt 10 which is provided with an affixed to evenly spaced guide rings 9 which are also fixed to the circular support rail 7. A detailed view of above mentioned assembly is shown in FIG. 10. Also shown is vertical bar 15 attached to sides of skirt by conventional means which provides skirt with unifrom edges complimenting film access plates 11 and 12.

Figure 6:
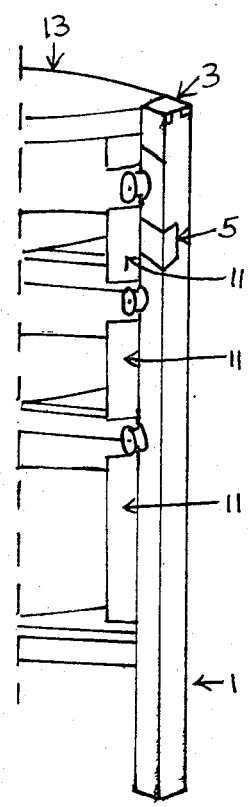
FIG. 6 is a rear-left fractional oblique view of access indenture left plate in a mounted position on a film supply and take-up apparatus.

As shown in FIG. 1 and FIG. 6 film access left 11 and right 12 plates are provided with indentures for ready film ingress and egress as required. Vertically mounted and supported, the film access left 11 and right 12 plates are fixed to and supported by the vertical support and attaching column 2 as more particularly described in FIG. 6 by conventional weld or bolt means.

Figure 7:
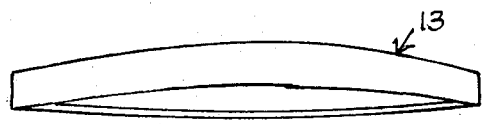
FIG. 7 is an underside view of invention canopy.
Figure 8:
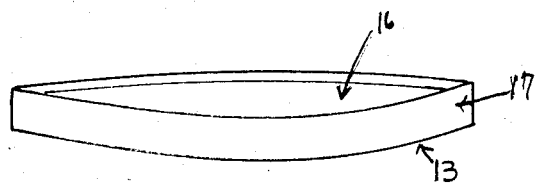
FIG. 8 is an elevated oblique view of invention canopy in an inverted position.

In detail, the canopy 13 as shown in perspective view FIG. 7, generally as oriented while being positioned on film-supply and take-up device. A top view is contained in FIG. 8.

The canopy 13 is basically composed of 2 connected sections, cut out of nylon or other suitable, water repellant, lightweight and durable material. The shape of canopy is substantially circular in form, dictated by the shape of the film-supply and take-up device which it is designed to cover, and is of a neat and ornamental appearance.

The top section 16 is material circular in shape conforming to the size of the film-supply and take-up device. The side section 17 is a band of like material with equal height and a width equal to the circumference of top section 16 permitting the neat enjoining of the two at a 90° angle at the adjacent edges. The size of the sections required or desired may vary depending on the specific film-supply and take-up device used.

The stitch line forming the seam between top section and side section consists of smooth, tight stitches which will not separate or loosen after the cover has been in use a period of time. To further reinforce said seam connecting tip and side section, a corded piping has been added between adjacent edges of top 16 and side 17 sections, which also serves decorative purposes. the parts are preferrably sewn together, but other means of enjoining sections suited to the material used will suggest themselves to those acquainted with the fabrication of coverings.

Figure 9:
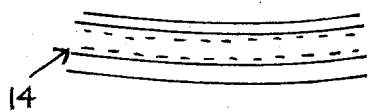
FIG. 9 is a view of canopy hem assembly showing reinforced edge and stitching.

As detailed in FIG. 9, a hem, that is an area of double thickness of material is incorporated. The hem is indicated in the drawing by reference 14. To further secure hem line of side section, a layer of fabric is secured over said hem to eliminate possibility of fraying.

The canopy will preferrably be made of waterproof, durable, yet lightweight material such as nylon. Such a material has the advantage that when the canopy is used directly to cover film and film-supply and take-up device a minimum amount of damaging pressure is on winding mechanism.

If desired, a contrast may be created for decorative purposes by using different color combinations for the different canopy sections. Also, advertising material or identifying indicia can be placed on or printed on the outer surface of the canopy.

While the above description contains many specifications, these should not be construed as limitations on the scope of the invention, but rather as an exemplification of one preferred embodiment thereof.

I claim:

1. A combination motion picture film and film-supply and take-up system cover for the protection of film and film-supply and take-up apparatus comprising, in combination, a rigid frame mounted on the vertical film supply and take-up apparatus column, a reasonable distance above the filmsupply and take-up apparatus heing protected, a horizontal beam and brace secured to one end of vertical support-attach column of said frame, and circular support rail secured to the other end of said horizontal beam and brace, a canopy draped over the periphery of said circular support rail and with canopy skirt supported and guided by fixed circular support rail guide rings permitting canopy skirt to be arrayed in a compressed or extended condition about the circular support rail to contact the left and right across indenture plates being attached and supported in a vertical condition by the vertical support and attaching column.

* * * * *